Feb. 20, 1934.    W. F. McBRIDE    1,948,426
AIRCRAFT
Filed Dec. 28, 1932    3 Sheets-Sheet 1

Inventor
W. F. McBride
By Clarence A. O'Brien
Attorney

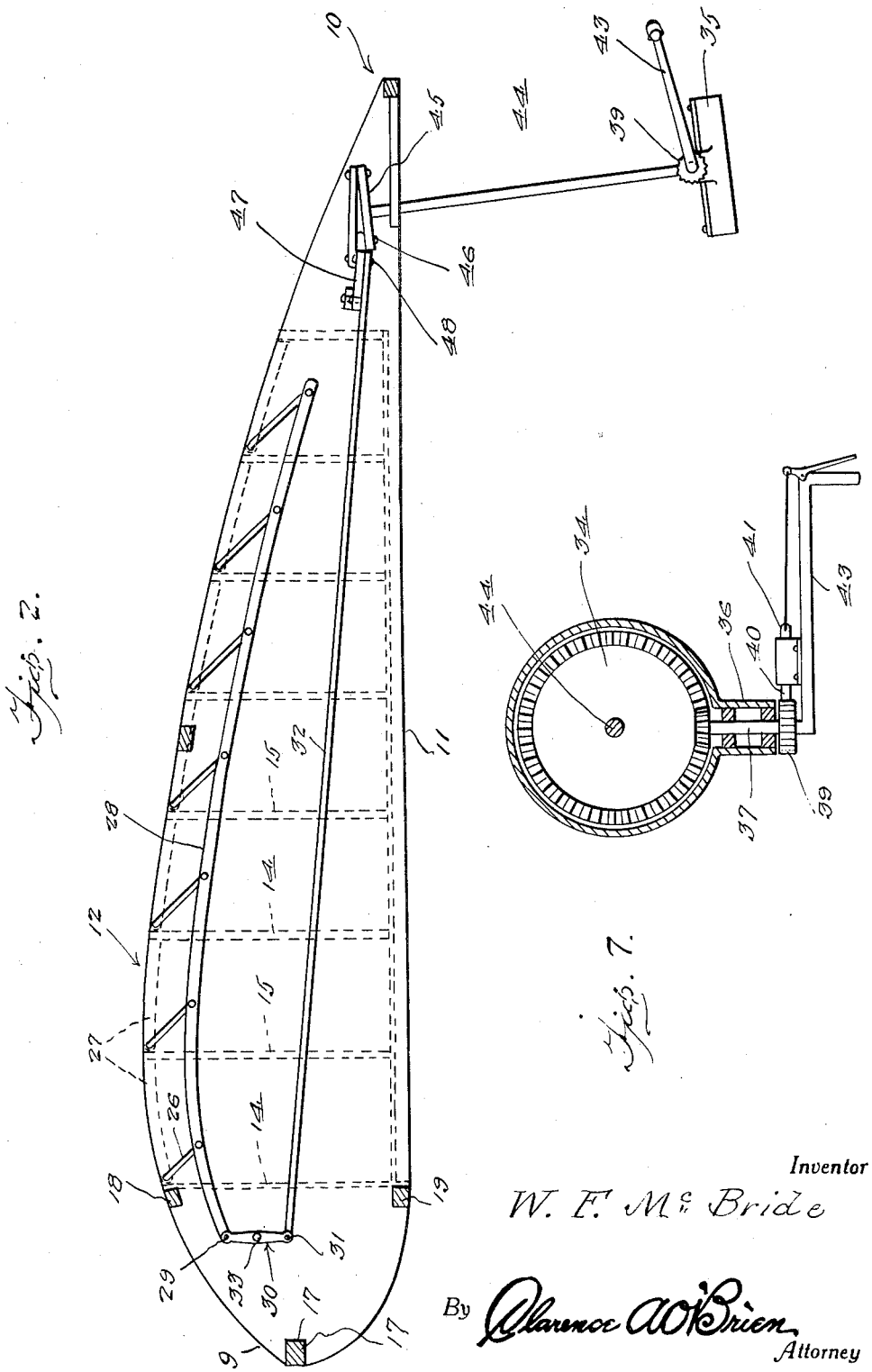

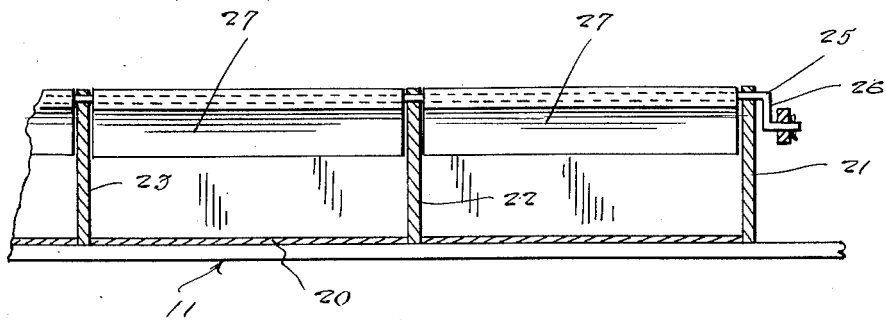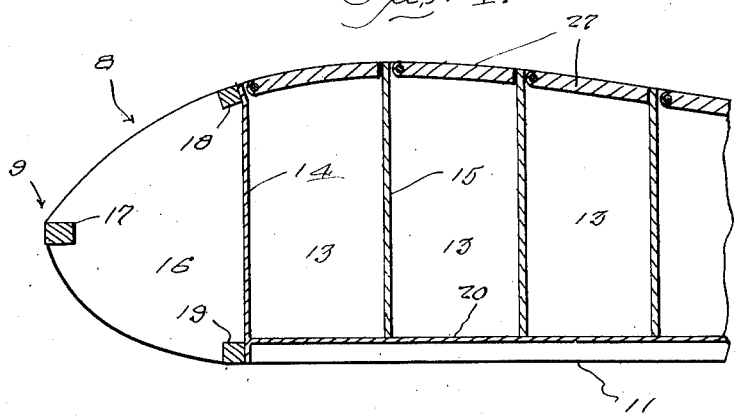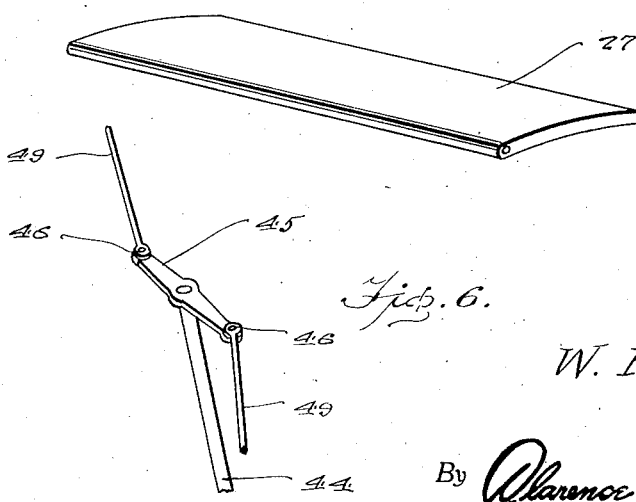

Patented Feb. 20, 1934

1,948,426

UNITED STATES PATENT OFFICE 1,948,426

AIRCRAFT

William F. McBride, Shreveport, La.

Application December 28, 1932
Serial No. 649,210

1 Claim. (Cl. 244—12)

My invention relates generally to improvements in aircraft and particularly to improvement in wing structures therefor.

It is an important object of my invention to provide in an aircraft an improved wing structure incorporating means for adjusting and modifying the same during the flight of the craft.

It is also an important object of my invention to provide in a wing structure for an aircraft, means for increasing the lifting effect of the wing structure, the said means being readily adjustable by the pilot whereby the lifting effect of the wing structure may be varied at will by the pilot.

It is also an important object of my invention to provide in a wing structure of the type described adjustable means for selectively varying the lifting power of the wing structure to enable carrying increased loads in the aircraft, for increasing the stability and controllability of the aircraft, and for facilitating and enabling safer and slower landings and take-offs.

It is also an important object of my invention to provide in a wing structure of the type described a variable upper surface for controllably increasing the vacuum effect thereof for increasing the lifting power of the wing while decreasing the slip thereof.

Other objects and advantages of my invention will be apparent from a reading of the following description in connection with the drawings, wherein for purposes of illustration I have shown a preferred embodiment of my invention.

In the drawings:—

Figure 2 is a transverse vertical sectional view taken approximately on the line 2—2 of Figure 1 and looking in the direction of the arrows.

Figure 3 is a longitudinal vertical sectional view taken approximately at right angles to Figure 2 showing movable parts of the wing section.

Figure 4 is a transverse vertical sectional view through the wing structure.

Figure 5 is a perspective view of one of the shutters.

Figure 6 is a perspective view of one of the toggle lever structures.

Figure 7 is a horizontal sectional view showing the manual control and operating means.

Figure 1:
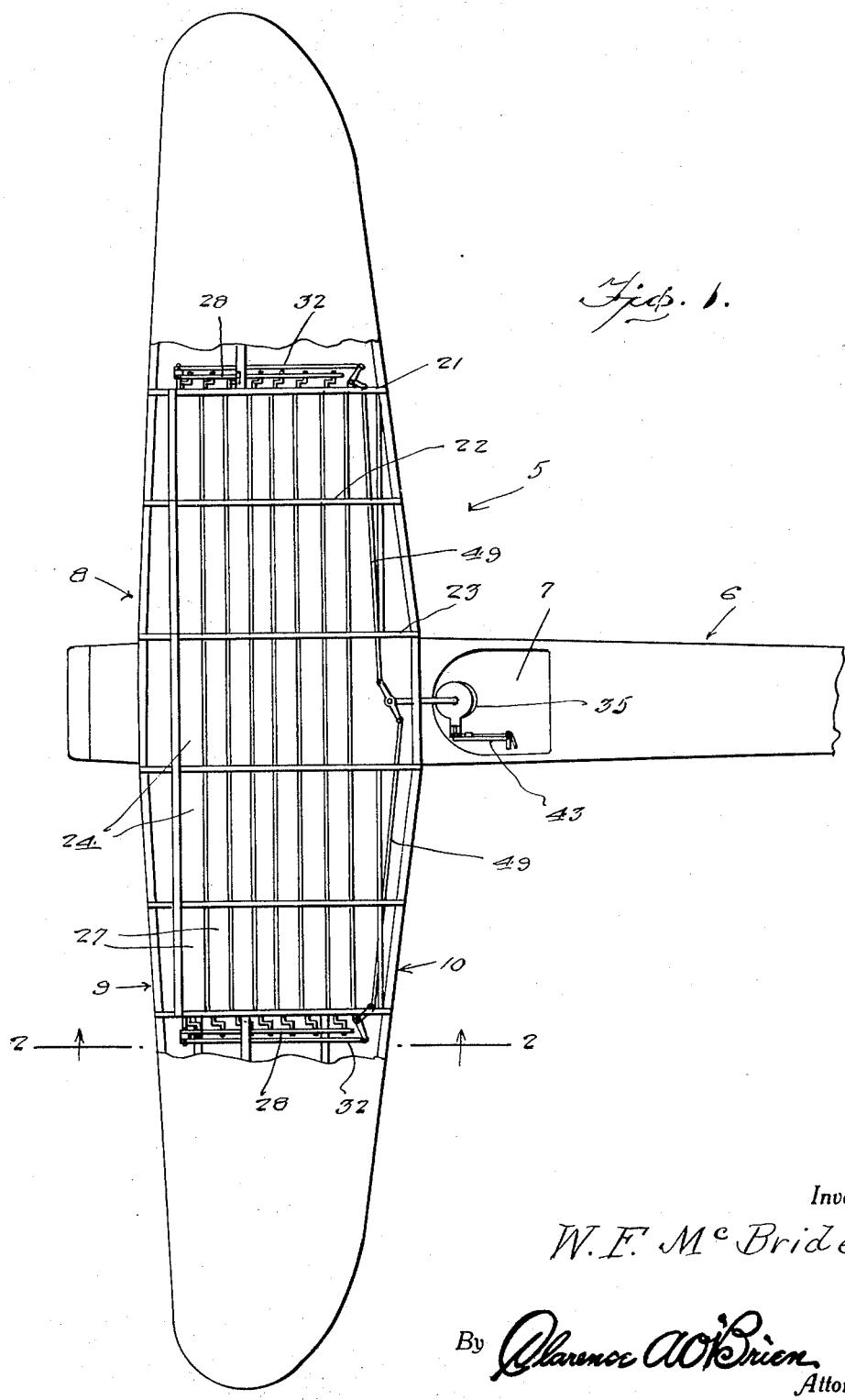
Figure 1 is a top plan view of an aeroplane embodying my invention, the wing structure thereof being shown broken away to expose interior parts.

Referring in detail to the drawings, wherein like numerals refer to like parts throughout the same, the numeral 5 refers generally to a conventional typs of aeroplane, such as a monoplane, which has the fuselage 6, the cock-pit 7 and the wing structure 8. It will be obvious that the invention is not limited to application to aeroplanes, nor to aeroplanes of the monoplane type.

The fuselage 6 and the cock-pit 7, and the general form of the single wing 8 being of generally conventional contour and arrangement, no necessity appears to describe them in detail, except to point out the differences in structure employed by me to gain the special controllable effects mentioned in the statement of the objects of the invention.

In Figure 4 is shown the sectional structure of the wing which comprises the usual leading edge 9, the trailing edge 10, the flat under-surface 11 and the cambered upper surface 12. Any form of structure which does not conflict with the arrangement to be described below may be utilized in forming the wing structure. According to my invention I divide about one-half of the wing structure into cells which are disposed crosswise of the fuselage and longitudinally of the wing 8. These cells 13 are narrow and elongated and are taller than they are wide, as will be obvious from an inspection of Figures 1, 3 and 4. Each cell is formed by a front wall 14 and a rear wall 15. The space 16 formed by the front wall 14 of the front cell may be utilized for fuel storage and may be built upon a frame work composed of such members as are indicated at 17, 18 and 19. The front wall 14 of the front cell may be secured to the members 18, 19. Near the under-surface 11 of the wing structure there is provided a false bottom 20 which closes the lower ends of the cells 13. As shown in Figure 1, the cells are traversed by transverse members 21, 22 and 23 on either side of the fuselage. The members 21, 22, 23 are in the nature of partitions connected to the false bottom 20, whereby to divide the cells 13 into a plurality of sub-cells aligned longitudinally and transversely of the wing structure. The numeral 24 is utilized to designate each of these sub-cells.

Through the forward upper part of each sub-cell enclosing portion of the partitions 21, 22 on either side of the wing structure is passed and is rotatably mounted a shaft 25 which has on either end a crank 26. The cranks 26 on the ends of the shafts 25 are in the same plane.

For covering each individual sub-cell 24 there is fixed on the associated portion of the associated shaft 25 a shutter 27 which is adapted to have such a curvature and disposition on the shaft 25 as will give a normal cambered upper surface to the wing, as illustrated in Figure 4. The free edges of the shutters are so designed that when they are depressed from the positions shown in Figure 4 and then returned to the positions shown in Figure 4, the free edges will abut against the adjacent rear walls 15, so that the shutters are maintained in proper position.

It will be obvious that when the shutters are in the normal positions illustrated in Figure 4 that the normal wing contour and effect will obtain in flight on the aircraft, and that when the shutters are depressed from such positions so as to open and expose the sub-cells, that a marked increase in the vacuum effect of the upper side of the wing will be produced. The amount of such effect may be controlled by controlling the amount of depression of the shutters from the normal positions. It will be obvious that this arrangement enables the conversion of a speed plane to a load carrying plane, simply by varying the lifting capacity of the wing by opening to a selected degree the shutters 27.

Means for operating the shutters 27 comprises tubular members 28, which have a curvature similar to that of the camber of the upper part of the wing, and to which are rockably connected the cranks 26 in properly spaced and co-related manner. As shown in Figure 2, the cranks 26 are shown to have a similar angularity. One of the members 28 is located on either side of the cell structure. The forward end of each member 28 is pivotally connected by a link 29 to the extremity of one arm of the toggle lever 30, the extremity of the other arm indicated at 31 being connected to an operating rod 32. The toggle lever 30 is carried at its center on a shaft 33 which is disposed longitudinally of the wing structure so as to connect with and carry the toggle lever at the other side of the cell structure from that shown in Figure 2. It will be noted that the toggle lever 30 has a normal perpendicular position, being perpendicular to the lower surface 11 of the wing structure. It will be obvious that moving the operating rod 32 backwardly and forwardly will operate the shutters 27 open and closed.

Means for operating the operating rods 32 comprises a toothed wheel 34 mounted in a suitable casing 35 mounted in the upper part of the cock-pit within easy reach of the pilot. The casing 35 has an extension 36 in which is mounted a short shaft 37 carrying at its inner end a pinion 38 for engaging with and operating the toothed wheel 34. This is mounted in suitable bearings and carries at its outer end a small toothed wheel 39 with which is engageable the pawl 40 of a release lock mechanism 41 having the operating handle 42. The release lock mechanism 41 and the handle 42 are suitably mounted upon a crank handle 43 which is to be rotated by the pilot for rotating the wheel 34. The wheel 34 has fixed therein a vertical shaft 44 which projects upwardly and carries on its upper end within the trailing edge portion of the wing structure a toggle lever 45 which is normally horizontal with respect to the lower surface 11 of the wing structure. To either end of the toggle lever 45 as indicated at 46 is connected a link 49 which is connected to one arm of a bell crank 47 suitably mounted in the wing structure, and whose other arm is connected to the rearward end of the operating rod 32 as indicated at 48. This provides means offering a great mechanical advantage whereby the pilot is enabled to adjust the shutters open or closed and to lock the same in adjusted positions, without such effort as would detract from concentration upon the other duties of a pilot when the aeroplane is in flight.

Though I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claim.

What is claimed is:—

The combination with a wing structure having a leading edge, a trailing edge, an under surface and an upper surface, of a plurality of relatively small cells located in the wing structure and entirely closed excepting at their upper ends which open out through the upper surface and in which cells a vacuum is created by the air passing over said upper surface, adjustable shutters in the openings, said shutters, when closed, forming a part of said upper surface, each shutter being pivotally connected at its forward edge to the front wall of the opening in a cell and opening downwardly into a cell and means for operating the shutters and locking the same in adjusted position.

WILLIAM F. McBRIDE.